United States Patent Office 3,304,320
Patented Feb. 14, 1967

3,304,320
ORGANOSILICON COMPOSITIONS
Ralph D. Spencer, Pitcairn, Pa., assignor to Dow Corning Corporation, Midland, Mich., a corporation of Michigan
No Drawing. Filed June 17, 1963, Ser. No. 288,553
5 Claims. (Cl. 260—448.2)

This invention relates to organosilicon compounds containing the configuration

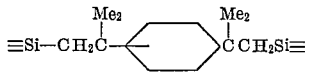

It is the object of this invention to prepare novel organosilanes which are useful in the preparation of organosiloxane fluids, resins and rubbers. Other objects and advantages will be apparent from the following description.

This invention relates to silanes of the formula

in which X is halogen, hydrogen, alkoxy or hydroxyl and R is a hydrocarbon or halohydrocarbon radical.

The above silanes are prepared by reacting bis-chlorotertiarybutylbenzenes of the formula

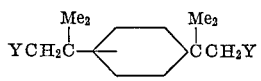

in which Y is a halogen atom with magnesium to form a Grignard reagent and then coupling this intermediate with a halosilane of the formula

where Y is a halogen atom. This reaction is best carried out in tetrahydrofuran as a solvent.

The bis-chlorotertiarybutylbenzenes are prepared by reacting 2 mols of a methallyl halide with 1 mol of benzene in the presence of concentrated sulfuric acid as is more fully described in the examples below. During the reaction a mixture of isomers is formed in which the meta and para isomers predominate. If desired, the isomers can be separated before coupling with the halosilane or one can employ the mixed isomers and obtain a mixture of isomeric silanes.

For the purpose of this invention R can be any hydrocarbon or halohydrocarbon radical such as any alkyl radical such as methyl, ethyl, isopropyl or octadecyl; any alkenyl radical such as vinyl, allyl, hexenyl or butynyl; any cycloaliphatic hydrocarbon radical such as cyclohexyl, cyclohexenyl, cyclopentyl or methylcyclohexyl; any aryl hydrocarbon radical such as phenyl, xenyl, naphthyl, anthracyl, tolyl or xylyl and any aralkyl hydrocarbon radical such as benzyl, beta-phenylethyl or beta-phenylpropyl. R can also be any halohydrocarbon radical such as chloromethyl, beta-chloropropyl, bromobenzyl, chlorophenyl, $\alpha,\alpha,\alpha$-trifluorotolyl, chlorocyclohexyl, trifluorovinyl, trifluoropropyl or bromobenzyl. It should be understood that the R groups in any one silane can be all the same or each R group can be different.

As stated above, X can be any halogen atom such as chlorine, bromine or fluorine, or any alkoxy radical such as methoxy, ethoxy, isopropoxy or octadecyloxy.

This invention also relates to siloxanes having at least one siloxane unit of the formula (I)  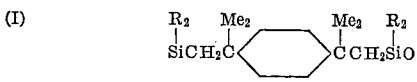

in which siloxane any remaining siloxane units being of the formula (II) $R'_nSiO_{4-n/2}$ in which R' is hydrogen, monovalent hydrocarbon or monovalent halohydrocarbon and n has a value from 0 to 3 inclusive.

Thus, it can be seen that the siloxanes of this invention can be homopolymers composed entirely of units (I) in which all of the units are identical or it can be composed of copolymers composed entirely of units (I) in which the units differ. In addition, the siloxanes of this invention can be copolymers containing both units of the type (I) and units of the type (II).

The siloxanes of this invention, both the homopolymers and copolymers, can be prepared by conventional techniques for converting silanes into the corresponding siloxanes. Thus, the silanes supra can be hydrolyzed and condensed by conventional techniques or they can be co-hydrolyzed and co-condensed by conventional techniques to give the homopolymers and copolymers of this invention.

For the purpose of this invention, R' can be any hydrocarbon radical such as any alkyl radical such as methyl, ethyl, isopropyl, butyl or octadecyl; any alkenyl radical such as vinyl, allyl or octadecenyl; any cycloaliphatic hydrocarbon radical such as cyclohexyl, cyclohexenyl, cyclopentyl and methylcyclohexyl; any aryl hydrocarbon radical such as phenyl, xenyl, naphthyl, anthracyl, tolyl or xylyl; or any aralkyl hydrocarbon radical such as benzyl, $\beta$-phenylethyl, and $\beta$-phenylpropyl. R' can also be any halohydrocarbon radical such as chloromethyl, gamma-chloropropyl, trifluoropropyl, pentafluorobutyl, trifluorovinyl, $\alpha,\alpha,\alpha$-trifluorotolyl, chlorophenyl, dibromophenyl, chlorocyclohexyl, or chlorobenzyl.

As stated above, n can have a value from 0 to 3 which means that the $R'_nSiO_{4-n/2}$ units can be any combination of the type $R'SiO_{3/2}$, $R'_2SiO$, $R'_3SiO_{.5}$ or $SiO_2$.

It should be understood that the siloxanes can also contain silicon-bonded hydrolyzable groups such as halogen, alkoxy, acyloxy, ketoxime, etc. which are often present in siloxanes and such siloxanes are included within the scope of the instant claims.

The following examples are illustrative only and should not be construed as limiting the invention which is properly delineated in the appended claims.

Example 1

117 g. of thiophene-free benzene was added with stirring to 307 g. of reagent grade 95.5 percent sulfuric acid. The temperature during the addition was 10° C. The mixture of 453 g. of methallylchloride and 117 g. of benzene was added dropwise to the mixture over a period of two hours while the mixture was maintained at 10° C. The mixture was allowed to warm to room temperature with stirring and the stirring was continued for an additional half hour. The reaction mixture was poured into a separatory funnel and allowed to stand overnight. The layers were separated and the organic layer was washed with three 75 ml. portions of 80 percent sulfuric acid and 250 ml. of distilled water. The organic layer was dried with potassium carbonate and distilled and there was obtained a main fraction boiling 125 to 133° C. at .4 mm. which consisted of a mixture of meta and para isomers of bis(chlorotertiarybutyl)benzene. The para isomer crystallized on standing and was recrystallized from the petroleum ether and dried. It had a melting point of 53.5 to 54° C.

Example 2

7.5 g. of magnesium and a crystal of iodine were added to a flask and heated to 200° C. under nitrogen. After cooling 40 ml. of tetrahydrofuran and 35.3 g. of the p-bis(chlorotertiarybutyl)benzene was added. Heating was begun and the reaction started when the tetrahydrofuran first began to reflux. Heating was continued and 150 ml. of tetrahydrofuran was added dropwise over a period of one hour. The mixture was then heated and stirred for an additional two hours.

38 g. of dimethylchlorosilane was added gradually over a period of a half an hour and the mixture was then heated and stirred for two hours. The mixture was cooled and poured over ice and the layers were separated. The organic layer was dried over sodium sulfate. Upon distillation there was obtained the product

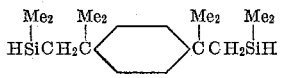

boiling 98° C. at 90µ.

Example 3

A small pellet of sodium was dissolved in 150 ml. of absolute ethanol and the mixture was heated to reflux. 25 g. of the product of Example 2 was added to the refluxing ethanol over 15 minutes and the mixture was refluxed for 5 hours until hydrogen evolution had ceased. A portion of the reaction product was diluted with benzene and washed with water until neutral. The organic layer was dried and the solvent removed to obtain the compound

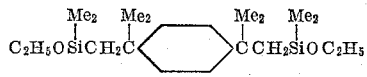

boiling 98° C. at 2 to 5µ.

Example 4

20 g. of the product of Example 2 was poured into the excess of 90 percent methanol and 10 percent water in which sodium hydroxide had been dissolved to give a 15 percent solution. The mixture was stirred approximately 28 to 30° C. for about 8 hours. It was then poured into an ice water mixture containing more than enough potassium acid phosphate to neutralize the alkali. A precipitate immediately formed which was filtered, washed free of solvents, dissolved in methylene chloride and then washed with water and finally recrystallized from a petroleum ether-methylene chloride solution. The product was para-bis[1,1-dimethyl-2-(dimethylhydroxysilyl)ethyl]-benzene having a melting point of 91 to 94° C.

Example 5

3 g. of powdered diol of Example 4 and a catalytic amount of KOH were mixed with xylene and refluxed under a water trap. Water was removed. The product was finally heated 175 to 198° C. under dry nitrogen for 10 hours. The resulting product was a polysiloxane of the unit formula

Example 6

When the Grignard reagent of Example 2 is added to a solution of dimethyldichlorosilane under the conditions of Example 2 in an amount such that there is an excess of dimethyldichlorosilane in the reaction mixture, the product

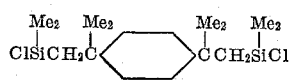

is obtained.

Example 7

When the meta-bis(chlorotertiarybutyl)benzene of Example 1 is substituted in the procedure of Example 2, the compound meta-bis[1,1 - dimethyl-2-(dimethylhydrogensilyl)-ethyl]benzene is obtained.

When this material is reacted in accordance with the procedure of Example 4, the diol

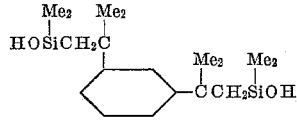

is obtained.

When this diol is condensed with KOH as shown in Example 5, a siloxane of the unit formula

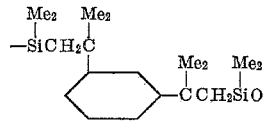

is obtained.

Example 8

When the following silanes are substituted for the dimethylchlorosilane in Example 2, the following products are obtained. In the products the symbol Z is the group

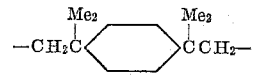

| Silane | Product |
|---|---|
| Ph₂<br>CH₃OSiCl | Ph₂ Ph₂<br>CH₃OSiZSiOCH₃ |
| Me₂<br>C₁₈H₃₇OSiCl | Me₂ Me₂<br>C₁₈H₃₇OSiZSiOC₁₈H₃₇ |
| CH=CH₂<br>(CH₃)₂CHOSi-Cl<br>C₂H₅ | CH=CH₂  CH=CH₂<br>(CH₃)₂CHOSi—Z—SiOCH(CH₃)₂<br>C₂H₅  C₂H₅ |
| ⬡S<br>\|<br>HSiCl<br>\|<br>S⬡ | ⬡S  S⬡<br>\|   \|<br>HSi—Z—SiH<br>\|   \|<br>S⬡  ⬡S |
| Me<br>⬡<br>\|<br>CH₃OSiCl<br>\|<br>CH₂<br>\|<br>⬡<br>\|<br>C₁₈H₃₇<br>HSiCl<br>\|<br>Me | Me   Me<br>⬡    ⬡<br>\|    \|<br>CH₃OSi—Z—SiOCH₃<br>\|    \|<br>CH₂   CH₂<br>\|    \|<br>⬡    ⬡<br>\|    \|<br>C₁₈H₃₇  C₁₈H₃₇<br>HSi—Z—SiH<br>\|    \|<br>Me   Me |
| (CF₃<br>CH₂<br>CH₂)₂<br>CH₃OSiCl | (CF₃    (CF₃<br>CH₂    CH₂<br>CH₂)₂  CH₂)₂<br>CH₃OSi—Z—SiOCH₃ |

| Silane | Product |
|---|---|
| 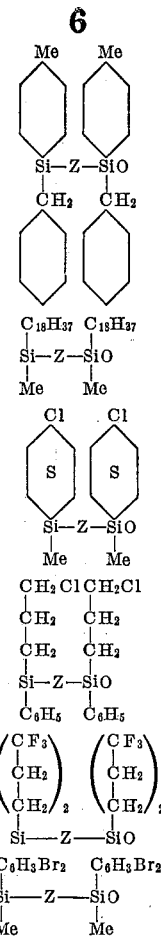 | |

Example 9

When the products of Example 7 are hydrolyzed and condensed with tetramethylguanidine octoate as the catalyst, the following siloxanes are obtained:

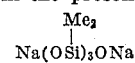

Example 10

When the following silanes are cohydrolyzed and the products condensed in the presence of the salt $$Na(OSi)_3ONa \quad \text{with} \ Me_2$$

the following copolymers are obtained.

| | Silane | Mol percent | Copolymer | Mol percent |
|---|---|---|---|---|
| (1) | $Me_2SiCl_2$ | 75 | $Me_2SiO$ | 75 |
| | $ \begin{array}{cc} Me_2 & Me_2 \\ ClSi\!-\!Z\!-\!SiCl \end{array}$ | 25 | $\begin{array}{cc} Me_2 & Me_2 \\ Si\!-\!Z\!-\!SiO \end{array}$ | 25 |
| (2) | $C_{18}H_{37}\overset{Me}{\underset{}{Si}}Cl_2$ | 5 | $C_{18}H_{37}\overset{Me}{\underset{}{Si}}O$ | 5 |
| | $C_6H_5\overset{Me}{\underset{}{Si}}Cl_2$ | 15 | $C_6H_5\overset{Me}{\underset{}{Si}}O$ | 15 |
| | $CH_2\!=\!CH\overset{Me}{\underset{}{Si}}Cl_2$ | 1 | $CH_2\!=\!CH\overset{Me}{\underset{}{Si}}O$ | 1 |
| | $CF_3CH_2CH_2\overset{Me}{\underset{}{Si}}Cl_2$ | 25 | $CF_3CH_2CH_2\overset{Me}{\underset{}{Si}}O$ | 25 |
| | $\begin{array}{cc} Me_2 & Me_2 \\ ClSi\!-\!Z\!-\!SiCl \end{array}$ | 54 | $\begin{array}{cc} Me_2 & Me_2 \\ Si\!-\!Z\!-\!SiO \end{array}$ | 54 |

TABLE—Continued

| Silane | Mol percent | Copolymer | Mol percent |
|---|---|---|---|
| (3) [C₆H₄S]SiCl₃ | 10 | [C₆H₄S]SiO₃/₂ | 10 |
| Br₂C₆H₃Si(Me)Cl₂ | 10 | Br₂C₆H₃Si(Me)O | 10 |
| CH₃-[C₆H₄]-Si(Me)Cl₂ | 10 | CH₃-[C₆H₄]-Si(Me)O | 10 |
| CF₃-[C₆H₄]-Si(Me)Cl₂ | 10 | CF₃-[C₆H₄]-Si(Me)O | 10 |
| ClSi(Me₂)—Z—Si(Me₂)Cl | 1 | Si(Me₂)—Z—Si(Me₂)O | 1 |
| [C₆H₄]CH(Me)CH₂Si(Me₂)Cl | 59 | [C₆H₄]CH(Me)CH₂Si(Me₂)O₁/₂ | 59 |

Example 11

When the following silanes are cohydrolyzed and cocondensed by heating in the presence of a catalytic amount of sulfuric acid, the following copolymer is obtained.

| Silane | Mol percent | Copolymer | Mol percent |
|---|---|---|---|
| MeSi(H)Cl₂ | 10 | MeHSiO | 10 |
| ClCH₂CH₂CH₂Si(Me)Cl₂ | 20 | ClCH₂CH₂CH₂Si(Me)O | 20 |
| Cl-[C₆H₄S]-Si(Me)Cl₂ | 20 | Cl-[C₆H₄S]-Si(Me)O | 20 |
| ClSi(Me₂)—Z—Si(Me₂)Cl | 50 | Si(Me₂)—Z—Si(Me₂)O | 50 |

That which is claimed is:

1. A silane of the formula $$XSiR_2CH_2C(Me_2)\langle C_6H_4\rangle C(Me_2)CH_2SiR_2X$$

in which
X is selected from the group consisting of halogen, hydrogen, alkoxy and hydroxyl and
R is selected from the group consisting of monovalent hydrocarbon and monovalent halohydrocarbon radicals.

2. A compound of the formula

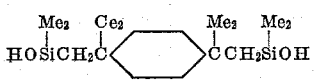

3. A compound of the formula

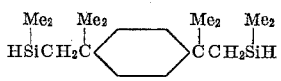

4. A siloxane containing at least one siloxane unit of the formula

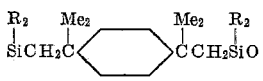

in which
R is selected from the group consisting of monovalent hydrocarbon radicals and monovalent halohydrocarbon radicals, any remaining units in said siloxane being essentially all of the formula $R'_nSiO_{4-n/2}$ in which
R' is selected from the group consisting of monovalent hydrocarbon radicals, monovalent halohydrocarbon radicals and hydrogen atoms and
n is an integer from 0 to 3 inclusive.

5. A siloxane of the unit formula

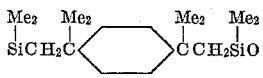

References Cited by the Examiner

UNITED STATES PATENTS

| | | | |
|---|---|---|---|
| 2,561,429 | 7/1951 | Sveda | 260—448.2 |
| 2,562,000 | 7/1951 | Sveda | 260—448.2 |
| 2,612,510 | 9/1952 | Hatcher et al. | 260—448.2 |
| 3,050,542 | 8/1962 | Piccoli | 260—448.2 |
| 3,086,954 | 4/1963 | Polmanteer et al. | 260—448.2 |
| 3,105,085 | 9/1963 | Toporcer | 206—448.2 |

OTHER REFERENCES

Wilson et al.: "Jour. Organic Chem.," vol. 24, November 1959, pages 1791–2.

HELEN M. McCARTHY, *Acting Primary Examiner.*

SAMUEL H. BLECH, *Examiner.*

PAUL F. SHAVER, *Assistant Examiner.*

UNITED STATES PATENT OFFICE
CERTIFICATE OF CORRECTION

Patent No. 3,304,320  February 14, 1967

Ralph D. Spencer

It is hereby certified that error appears in the above numbered patent requiring correction and that the said Letters Patent should read as corrected below.

Column 7, lines 64 and 65, the formula should appear as shown below instead of as in the patent:

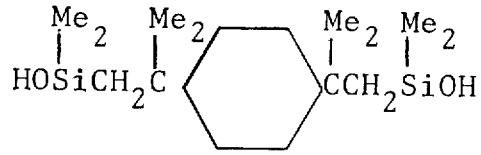

Signed and sealed this 17th day of June 1969.

(SEAL)
Attest:

EDWARD M. FLETCHER, JR.
Attesting Officer

WILLIAM E. SCHUYLER, JR.
Commissioner of Patents